(12) United States Patent
Cook et al.

(10) Patent No.: US 7,207,117 B1
(45) Date of Patent: Apr. 24, 2007

(54) GAUGE WITH FLOODLIGHTING, LIGHT RING, AND HUBLESS POINTER

(75) Inventors: David M Cook, Plymouth, MI (US); Jagadeesh Krishnamurthy, Troy, MI (US); Kevin Sockolosky, Plymouth, MI (US); Steven Tononi, Clinton Township, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 11/360,622

(22) Filed: Feb. 23, 2006

(51) Int. Cl.
*G01D 11/28* (2006.01)

(52) U.S. Cl. ............ 33/286; 116/DIG. 5; 116/DIG. 36; 362/26; 362/30

(58) Field of Classification Search ............... 116/62.1, 116/62.4, 286, 287, 288, DIG. 5, DIG. 6, 116/DIG. 36; 362/26, 30
See application file for complete search history.

(56) References Cited

U.S. PATENT DOCUMENTS

| | | | | |
|---|---|---|---|---|
| 2,259,910 A | * | 10/1941 | Rylsky | ........................ 362/26 |
| 3,699,915 A | * | 10/1972 | Greene | ........................ 362/26 |
| 4,233,927 A | * | 11/1980 | Oikawa et al. | ............. 116/287 |
| 6,206,533 B1 | * | 3/2001 | Shi | .............................. 362/23 |
| 6,318,872 B1 | * | 11/2001 | Kato et al. | ..................... 362/26 |
| 6,334,688 B1 | * | 1/2002 | Niwa | ........................... 362/26 |
| 7,129,849 B2 | * | 10/2006 | Dinh et al. | ................. 340/688 |
| 2002/0041491 A1 | * | 4/2002 | Nakagawa et al. | ........... 362/23 |

* cited by examiner

*Primary Examiner*—R. Alexander Smith
(74) *Attorney, Agent, or Firm*—Harness, Dickey & Pierce, PLC

(57) ABSTRACT

A gauge of a vehicle instrument cluster includes a dial having indicia thereon. A pointer is rotatably mounted in the instrument cluster and movable to a plurality of positions relative to the dial. A light source is disposed in the gauge and adapted to direct light in a first direction. A light diverting member is disposed adjacent to the light source and receives light from the light source. The light diverting member includes a first and a second light exit areas. The first light exit area is adapted to direct a first portion of the light generally away from the dial. The second light exit area is adapted to direct a second portion of the light generally toward the dial.

20 Claims, 3 Drawing Sheets

GAUGE WITH FLOODLIGHTING, LIGHT RING, AND HUBLESS POINTER

FIELD OF THE INVENTION

The present invention relates generally to vehicle instrument clusters and, more particularly, to an instrument cluster gauge incorporating a lighting configuration.

BACKGROUND OF THE INVENTION

Instrument clusters on automobiles generally include a plurality of gauges for displaying operational information such as vehicle speed, engine RPM, engine temperature, fuel level and many other information. The gauges may include analog or digital readings for displaying the information depending on the manufacturer and styling preferences. An analog gauge typically includes a faceplate having indicia thereon such as numbers and a pointer for rotating to the appropriate number, level, etc.

One important design consideration for an instrument cluster and related gauges is the ability of a vehicle operator to easily view and read the gauges in all driving environments. One aspect to consider when designing an instrument cluster gauge is to provide numbers and other indicia that may be easily viewed by the operator. Typically an instrument cluster gauge is illuminated by a light source such as a light bulb or light emitting diode (LED) as examples.

SUMMARY OF THE INVENTION

A gauge of a vehicle instrument cluster includes a dial having indicia thereon. A pointer is rotatably mounted in the dial and movable to a plurality of positions relative to the dial. A light source is disposed proximate to the gauge and adapted to direct light in a first direction. A light diverting member is disposed adjacent to the light source and receives light from the light source. The light diverting member includes a first and a second light exit area. The first light exit area is adapted to direct a first portion of the light generally away from the dial. The second light exit area is adapted to direct a second portion of the light generally toward the dial.

According to other features, the light source further comprises a plurality of light sources adapted to direct light in a first direction. The first light exit area is adapted to reflect light in the form of a radial ring of light directed generally away from the dial. The radial ring of light is radially offset outboard of a path defined by a rotational sweep of the pointer. The light diverting member may be unitary and define a circular footprint. The plurality of light sources are arranged in a circular pattern.

The light diverting member may define laterally offset inboard and outboard longitudinal portions connected by an intermediate angled portion. The light diverting member defines an outer angled portion extending from the outboard longitudinal portion. The outer angled portion directs light toward the dial. The intermediate angled portion directs light away from the dial. A mask is arranged adjacent to the light diverting member and is adapted to obscure view of the light diverting member from a vehicle operator.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
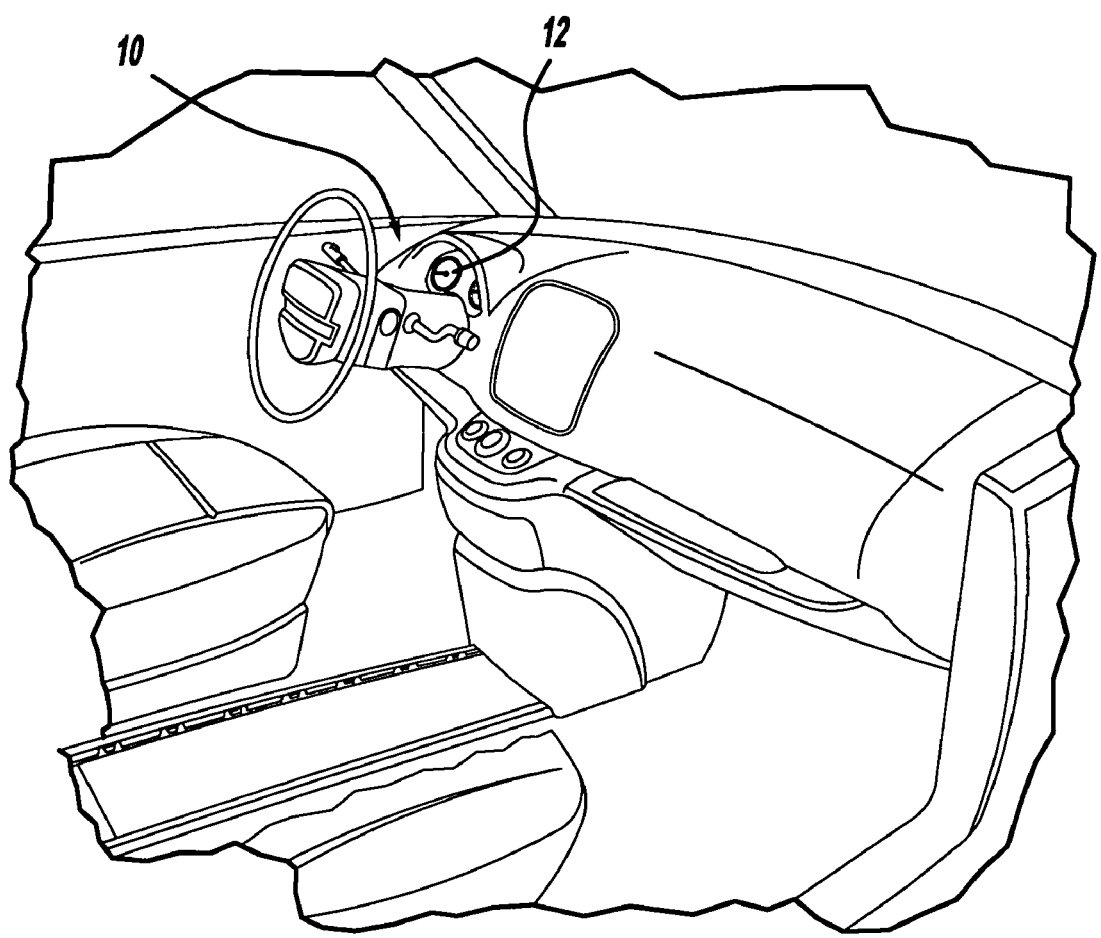
FIG. 1 is a perspective view of an exemplary vehicle cabin having an instrument cluster including a vehicle speedometer according to the present teachings.

FIG. 1 depicts an exemplary instrument cluster 10 in an automotive vehicle. The instrument cluster 10 may include various gauges and dials which are to be viewed and/or operated by an occupant of the vehicle. For example, a speedometer 12 may be used to display the speed at which a vehicle is traveling. The speedometer 12 according to the present teachings includes a movable pointer 14 (FIG. 2) which correlates to the speed of the vehicle. To provide meaningful graphical information to the occupant, a dial or faceplate 20 of the speedometer 12 forms the background for the pointer 14 of the speedometer 12. While the following discussion is specifically directed toward a speedometer, it is appreciated that the same may be applied to other gauges such as, but not limited to, a tachometer for example.

Figure 2:
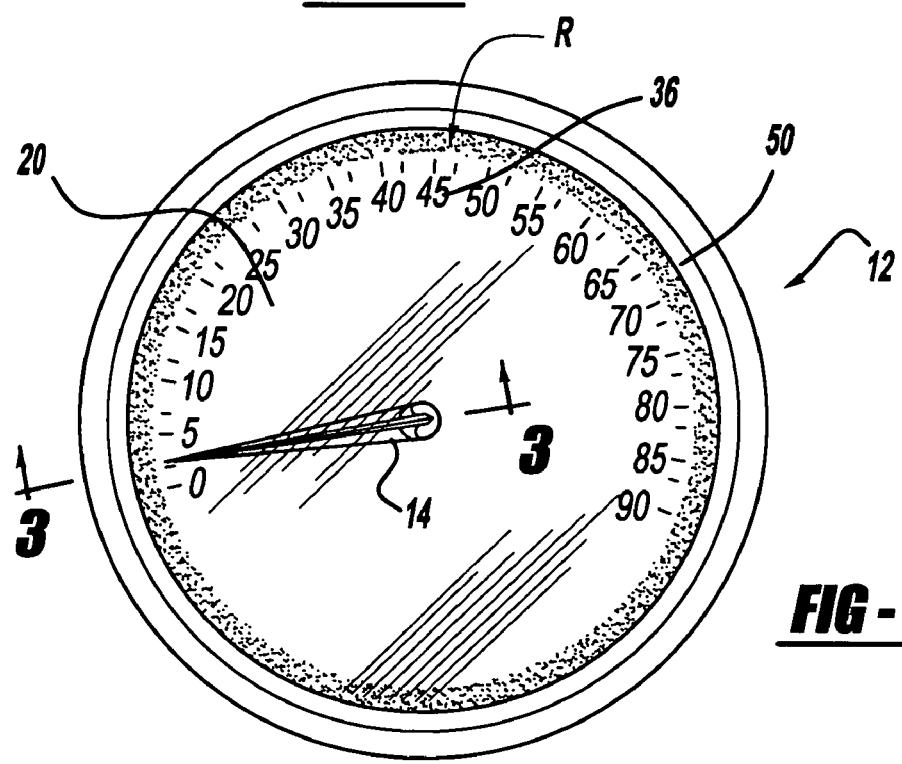
FIG. 2 is a front view of the vehicle speedometer of FIG. 1 according to the present teachings.
Figure 3:
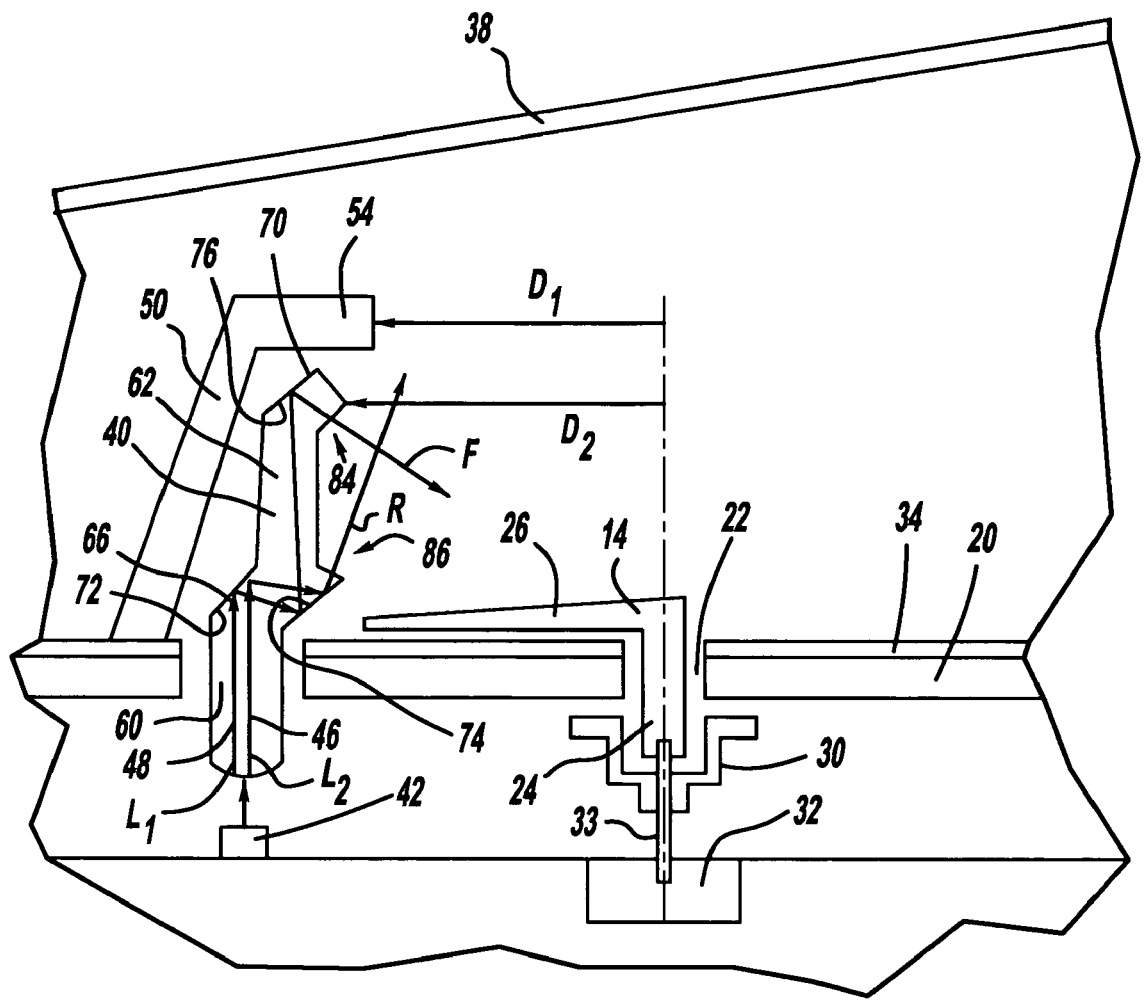
FIG. 3 is a cross-sectional view of FIG. 1 taken along line 3—3.
Figure 4:
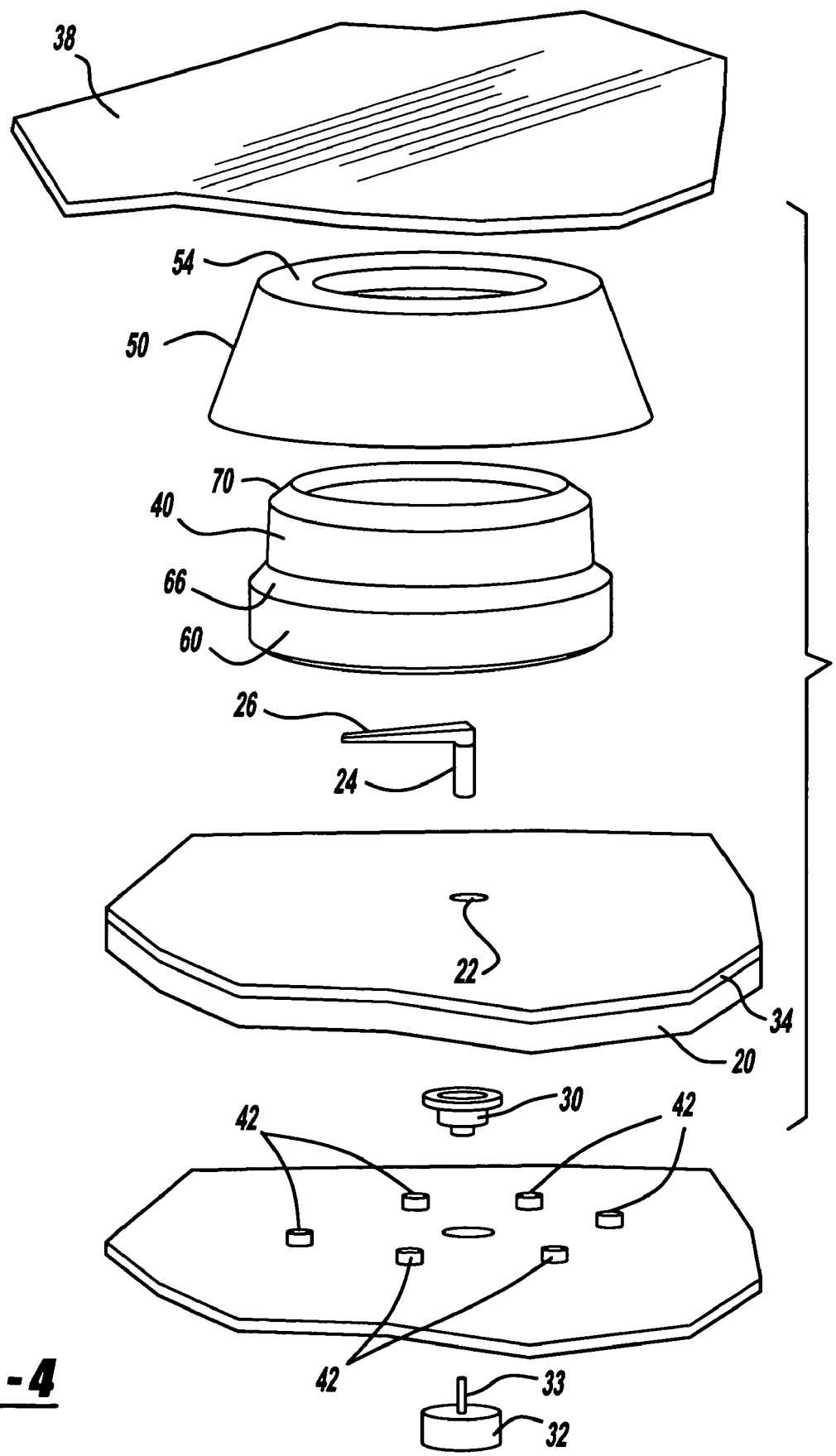
FIG. 4 is an exploded perspective view of the speedometer of FIG. 2.

With reference now to FIGS. 2–4, the speedometer 12 according to the present teachings provides a lighting configuration in which a common light source provides illumination onto the dial 20 in the form of floodlighting F (FIG. 3) as well as illumination around a periphery of the dial 20 in the form of a light ring R (FIGS. 2 and 3). The floodlighting illuminates the entire dial 20 as well as the pointer 14 whereby supplemental lighting, such as through the pointer 14, is unnecessary. An advantage of eliminating lighting through the pointer is that a lighting infrastructure consisting of wiring, printed circuit boards, light bulbs or LEDs, and a more complicated pointer, are not needed. As shown in FIG. 2, the light ring R is radially offset outboard of a tip of the pointer. As a result, the light ring R is radially offset outboard of a path defined by a radial sweep of the pointer 14.

The speedometer 12 will now be described in greater detail. The dial 20 generally defines a passage 22 for accepting the pointer 14 therethrough. The pointer 14 defines a mounting end 24 and a pointing end 26. The mounting end 24 may be disposed within a hub 30 attached to a motor 32. A shaft 33 extends from the motor 32, through the hub 30 and into the mounting end 24 of the pointer 14. The motor 32 may communicate with a vehicle module (not shown) and transmit rotational motion onto the pointer 14 indicative of vehicle speed. In one example, the pointer 14 may be a bright or reflective color such as a florescent material or chrome. As shown, the hub 30 is located inboard of the dial 20 giving the pointer 14 a hubless appearance. Furthermore, the passage 22 is radially offset a minimal distance from the outer diameter of the mounting end 24 of the pointer 14.

In one method of assembly, the hub 30 may be advanced onto the shaft 33 extending from the motor 32. The dial 20 may then be secured to the speedometer 12 by conventional methods. Next, the mounting end 24 of the pointer 14 may be coupled relative to the hub 30 by inserting the mounting end 24 of the pointer 14 through the dial passage 22. The mounting end 24 of the pointer 14 may then be advanced in a downward direction (as viewed from FIG. 3) until a portion of the proximal end of the shaft is inserted partially into the pointer 14. The dial 20 includes an appliqué 34 disposed on an outer face. The appliqué 34 may include indicia 36, markings and/or other graphics. A lens 38 may enclose the speedometer 12.

A light diverting member 40 is arranged around the dial 20. The light diverting member 40 is adapted to receive light from a light source 42 and direct a first portion of the light 46 generally away from the dial 20 (light ring R) and a second portion of the light 48 generally toward the dial 20 (floodlight F). The light source 42 may include any suitable light source such as a light bulb or light emitting diode (LED) for example. In the exemplary speedometer 12 shown, the light source 42 includes a series of LEDs arranged in a circular pattern inboard of the dial 20. The series of LEDs may include any number of LEDs, such as between four and eight sufficient to emit enough light for the light ring R and floodlight F to be properly observed by a user.

A cover member or mask 50 is arranged adjacent to the light diverting member 40. The mask 50 is adapted to obscure view of the light diverting member 40 from a vehicle operator and block any stray light from the light diverting member 40. In one example, the mask 50 may extend from the dial 20 at an angle and define a radial flange 54 on an outer end. The mask 50 may be unitary and configured to extend inboard a distance beyond the light diverting member 40. Explained differently, the mask 50 may define an inner diameter $D_1$ less than an inner diameter $D_2$ of the light diverting member.

The light diverting member 40 generally defines a unitary prism having a circular footprint. It is appreciated that the light diverting member 40 may define other shapes such as, but not limited to, semi-circular. In addition, the light diverting member 40 may alternatively define multiple pieces or sections. The light diverting member 40 includes an inboard and outboard longitudinal portion 60 and 62, respectively, connected by an intermediate angled portion 66. In one example, the inboard and outboard longitudinal portions 60 and 62 are parallel to each other and transverse from a plane defined by the dial 20. An outer angled portion 70 extends from the outboard longitudinal portion 62.

The light diverting member 40 includes three light reflecting surfaces 72, 74 and 76. The intermediate angled portion 66 defines the first and second light reflecting surfaces 72 and 74. The outer angled portion 70 defines the third light reflecting surface 76. Light emitted from the light source 42 enters the light diverting member 40 in a first direction. For illustrative purposes, a pair of exemplary light paths will be described. A first light path L1 travels through the inboard longitudinal portion 60 and reflects off the first light reflecting surface 72. The reflected light then reflects off the second light reflecting surface 74. Once reflected off the second reflecting surface 74, the first light path L1 travels through the outboard longitudinal portion 62 until contacting the third light reflecting surface 76. The third light reflecting surface 76 reflects the light out of the light diverting member 40 at a first light exit area 84 and onto the pointer 14 and the dial 20 (floodlighting F).

A second exemplary light path L2 will now be described. The second light path L2 travels through the inboard longitudinal portion 60 and reflects off the first light reflecting surface 72. The reflected light then reflects off the second light reflecting surface 74. Once reflected off the second reflective surface 74, the second light path L2 exits the light diverting member 40 at a second light exit area 86 and shines generally away from the dial 20 (light ring R) and such that a user may view it. Light ring R generally denotes the outer boundary of the indicia and defines the area within which a user should direct his or her attention when viewing the dial 20.

While the invention has been described in the specification and illustrated in the drawings with reference to various embodiments, it will be understood by those skilled in the art that various changes may be made and equivalents may be substituted for elements thereof without departing from the scope of the invention as defined in the claims. For example, while the drawings and related discussion are specifically directed toward a radial dial, the same may be applied to a gauge arranged in another pattern, such as linear. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A gauge of a vehicle instrument cluster comprising:
   a dial having indicia thereon;
   a pointer rotatably mounted in the instrument cluster and movable to a plurality of positions relative to the dial;
   at least one light source disposed in the gauge and adapted to direct light in a first direction; and
   a light diverting member disposed adjacent to said light source and receiving said light from said light source, said light diverting member having a first and a second light exit areas, said first light exit area adapted to direct a first portion of said light generally away from said dial and said second light exit area adapted to direct a second portion of said light generally toward said dial.

2. The gauge of claim 1 wherein said pointer is solid and light non-conductive.

3. The gauge of claim 2 wherein said first light exit area is adapted to reflect light in the form of a radial ring of light directed generally away from said dial.

4. The gauge of claim 3 wherein said radial ring of light is radially offset outboard of a path defined by a rotational sweep of said pointer.

5. The gauge of claim 4, further comprising a hub connected to a distal end of said pointer, said hub disposed inboard of said dial whereby said hub is substantially hidden from view by a vehicle operator.

6. The gauge of claim 3 wherein said radial ring of light is radially offset outboard of a path defined by a rotational sweep of said pointer.

7. The gauge of claim 6 wherein said light diverting member is unitary and defines laterally offset inboard and outboard longitudinal portions connected by an intermediate angled portion.

8. The gauge of claim 7 wherein said light diverting member defines an outer angled portion extending from said outboard longitudinal portion, said outer angled portion directing light toward said dial.

9. The gauge of claim 8 wherein said intermediate angled portion directs light away from said dial.

10. The gauge of claim 2 wherein said light diverting member is unitary.

11. The gauge of claim 10 wherein said light diverting member defines a generally circular footprint.

12. The gauge of claim 11 wherein said at least one light source comprises a plurality of light sources that are arranged in a circular pattern.

13. The gauge of claim 11 wherein said light diverting member defines laterally offset inboard and outboard longitudinal portions connected by an intermediate angled portion.

14. The gauge of claim 13 wherein said light diverting member defines an outer angled portion extending from said outboard longitudinal portion, said outer angled portion directing light toward said dial.

15. The gauge of claim 14 wherein said intermediate angled portion directs light away from said dial.

16. The gauge of claim 11, further comprising a mask arranged adjacent said light diverting member and adapted to obscure view of said light diverting member from a vehicle operator.

17. The gauge of claim 16 wherein said mask extends from said dial.

18. The gauge of claim 1 wherein said light source further comprises a plurality of light sources adapted to direct light in said first direction.

19. A gauge of a vehicle instrument cluster comprising:

a dial having indicia thereon;

a pointer rotatably mounted in the instrument cluster and movable to a plurality of positions relative to the dial;

a light source disposed in the gauge and adapted to direct light in a first direction; and a light diverting member disposed radially around said dial and adapted to receive said light in said first direction and deflect a portion of said light away from said dial in a circular pattern defining a light ring, said light diverting member further adapted to deflect another portion of said light toward said dial.

20. A gauge of a vehicle instrument cluster comprising:

a dial having indicia thereon;

a pointer rotatably mounted in the instrument cluster and movable to a plurality of positions relative to the dial;

a plurality of light sources disposed in the gauge and adapted to direct light in a circular pattern; and a light diverting member disposed radially around said dial and adapted to receive said light in said circular pattern and deflect a portion of said light away from said dial in the form of a circular ring of light, said light diverting member further adapted to deflect another portion of said light toward said dial thereby illuminating said dial and said pointer.

* * * * *